US006163618A

United States Patent [19]
Mukai

[11] Patent Number: 6,163,618
[45] Date of Patent: Dec. 19, 2000

[54] PAPER DISCRIMINATING APPARATUS

[75] Inventor: Masanori Mukai, Kawasaki, Japan

[73] Assignee: Fujitsu Limited

[21] Appl. No.: 09/049,932

[22] Filed: Mar. 30, 1998

[30] Foreign Application Priority Data

Nov. 21, 1997 [JP] Japan .................................... 9-321191

[51] Int. Cl.[7] ........................................ G06K 9/00
[52] U.S. Cl. ........................................ 382/135
[58] Field of Search ........................ 382/135, 318, 382/321, 322, 323, 298, 299, 300; 356/71

[56] References Cited

U.S. PATENT DOCUMENTS 4,464,786 8/1984 Nishito et al. .......................... 382/135
4,776,031 10/1988 Mita ........................................ 382/323
5,729,623 3/1998 Omatu et al. ........................... 382/155

FOREIGN PATENT DOCUMENTS 58-207013 12/1983 Japan ............................... G02B 7/11
63-187977 8/1988 Japan ............................. H04N 5/335
5-292256 11/1993 Japan ............................... H04N 1/04
6-133162 5/1994 Japan ............................... H04N 1/40

*Primary Examiner*—Andrew W. Johns
*Assistant Examiner*—Shervin Nakhjavan
*Attorney, Agent, or Firm*—Staas & Halsey LLP

[57] ABSTRACT

A paper discriminating apparatus has a data correction unit for generating image data associated with non-sensed areas, which are not detected by any of the sensor devices constituting a line sensor, and is capable of contributing to reduction of the sensor devices without producing any additional dictionary data.

10 Claims, 8 Drawing Sheets

PAPER DISCRIMINATING APPARATUS

BACKGROUND OF THE INVENTION

1. Field of the Invention

The present invention relates to a paper discriminating apparatus for discriminating papers such as paper money, and more particularly an apparatus for discriminating paper money, which is incorporated into an automatic teller machine (hereinafter, referred to as an ATM) for executing transactions such as receipt of money, payment, etc.

2. Description of the Related Art

An ATM for executing transactions such as receipt of money, payment, etc. through an operation of a user is provided with an apparatus for discriminating paper money received and paper money for payment. Hitherto, as this type of paper discriminating apparatus for discriminating papers such as paper money, there is known a paper discriminating apparatus having a line sensor comprising a plurality of sensor devices fixedly arranged in an arrangement direction perpendicularly intersecting with respect to a conveyance direction of papers in which a paper on carrying is scanned utilizing the carrying to obtain image data so that a discrimination of the paper is performed on the basis of the image data.

According to such a paper discriminating apparatus, usually, the sensor devices scan the full range of the paper to obtain the image data. For this reason, there is used a large number of sensor devices. Further, as a method of discriminating papers, usually, there is a method of discriminating papers in which a reference paper is scanned to collect a large number of image data, dictionary data are generated and stored beforehand on the basis of the image data, and the dictionary data are compared with the image data of the paper of interest for discrimination.

It is desired that the cost of a paper discriminating apparatus is saved. To accomplish this requirement, it is considered that the sensor devices constituting the line sensor are thinned to reduce the number of the sensor devices. A ground of reduction of the number of the sensor devices as a technique of the cost saving resides in the point that it may be considered that even if thinning the sensor devices brings about areas of the paper which are not subjected to sensing, this has no great effect on the accuracy of discrimination of the paper based on an image pattern of a whole of the paper.

However, in the event that the sensor devices are simply thinned, a paper will be discriminated on the basis of image data obtained by a line sensor in which the sensor devices are thinned. In this case, there occurs a need that a large number of reference papers are scanned by the line sensor thinned in the sensor devices to collect a large quantity of image data, and new dictionary data are generated over again on the basis of those image data by the use of the line sensor thinned in the sensor devices. However, a lot of time and hand are needed for generation of such dictionary data. Rather, this causes increasing of the cost, and thus there is a fear that the cost saving cannot be attained.

SUMMARY OF THE INVENTION

In view of the foregoing, it is therefore an object of the present invention to provide a paper discriminating apparatus capable of contributing to the reduction of the sensor devices without necessity for generating new dictionary data over again.

To accomplish the above-mentioned object, according to the present invention, there is provided a first paper discriminating apparatus wherein a paper conveyed in a predetermined conveyance direction is scanned in conjunction with a conveyance of the paper by a plurality of sensor devices arranged in an arrangement direction intersecting the predetermined conveyance direction to detect areas of the paper each being longitudinal with respect to the conveyance direction by associated sensor devices, respectively, and the paper is discriminated in accordance with image data obtained through a detection of the paper, said paper discriminating apparatus comprising:

a line sensor in which a plurality of sensor devices are arranged in the arrangement direction in such a manner that a non-sensed area on the paper, which is not detected by any of the sensor devices, is formed between two sensed areas to be detected by two adjacent sensor devices;

a data correction unit for generating image data associated with the non-sensed area on the paper;

a dictionary data unit for storing dictionary data associated with a full range of the paper, said dictionary data being a reference data for discrimination of the paper; and a dictionary comparing unit for comparing image data associated with the full range of the paper, said image data consisting of image data as to the sensed areas obtained by said line sensor and image data as to the non-sensed areas obtained by said data correction unit, with the dictionary data stored in said dictionary data unit, and thereby discriminating the paper detected by said line sensor.

According to the first paper discriminating apparatus of the present invention, the data correction unit generates the image data associated with the non-sensed area not detected by any of the sensor devices. This feature makes it possible to image data associated with the full range of the paper. Consequently, it is possible to discriminate the paper using the dictionary data associated with the full range of the paper, which is used in the conventional paper discriminating apparatus, and thus it is possible to contribute to reduction of the sensor devices without producing any additional dictionary data associated with the sense areas.

In the first paper discriminating apparatus of the present invention, it is desired that said paper discriminating apparatus further comprises an image processing unit for applying a predetermined image processing to the image data associated with the full range of the paper, said image data consisting of image data as to the sensed areas obtained by said line sensor and image data as to the non-sensed areas obtained by said data correction unit, said dictionary data unit stores dictionary data associated with image data subjected to the image processing by said image processing unit, and said dictionary comparing unit compares the image data subjected to the image processing by said image processing unit with the dictionary data stored in said dictionary data unit, and thereby discriminating the paper detected by said line sensor.

Applying the image processing to the image data by the image processing unit makes it possible to obtain image data in which image data as to the sensed areas and image data as to the non-sensed areas are averaged. A comparison of the averaged image data thus obtained with the dictionary data may perform a discrimination of papers on the basis of an overall aspect of the paper. Hitherto, when the image data is compared with the dictionary data for a discrimination, as mentioned above, it is general that an overall aspect of the paper is compared, but an aspect of the individual area detected by the associated sensor device is not compared. In effect, applying the image processing to the image data by the image processing unit makes it possible to prevent a degradation in accuracy of the discrimination of the paper and also to contribute to reduction of the sensor devices.

In the first paper discriminating apparatus of the present invention, it is acceptable that said data correction unit applies an interpolation processing to the image data as to the sensed areas obtained by said line sensor to generate image data as to the non-sensed areas.

Alternatively, it is acceptable that said data correction unit copies the image data as to the sensed areas obtained by said line sensor to be associated with each associated adjacent non-sensed area. It is also acceptable that said data correction unit causes a predetermined value to be associated with the non-sensed area.

To accomplish the above-mentioned object, according to the present invention, there is provided a second paper discriminating apparatus wherein a paper conveyed in a predetermined conveyance direction is scanned in conjunction with a conveyance of the paper by a plurality of sensor devices arranged in an arrangement direction intersecting the predetermined conveyance direction to detect areas of the paper each being longitudinal with respect to the conveyance direction by associated sensor devices, respectively, and the paper is discriminated in accordance with image data obtained through a detection of the paper, said paper discriminating apparatus comprising:

- a line sensor in which a plurality of sensor devices are arranged in the arrangement direction in such a manner that a non-sensed area on the paper, which is not detected by any of the sensor devices, is formed between two sensed areas to be detected by two adjacent sensor devices;
- a dictionary data unit for storing dictionary data associated with a full range of the paper, said dictionary data being a reference data for discrimination of the paper;
- a data extraction unit for extracting partial data associated with sensed areas of a stripe shape on the paper detected by said line sensor from the dictionary data stored in said dictionary data unit; and
- a dictionary comparing unit for comparing image data as to the sensed areas obtained by said line sensor with the partial data extracted by said data extraction unit, and thereby discriminating the paper detected by said line sensor.

According to the second paper discriminating apparatus, as mentioned above, the partial data associated with sensed areas is extracted from the conventional dictionary data, and the extracted partial data is compared with the image data obtained from the line sensor to perform a discrimination of the paper. Thus, even if the sensor devices are reduced, it is possible to utilize the dictionary data associated with the full range of the paper without any change of the dictionary data. Therefore, it is possible to contribute to reduction of the sensor devices without producing additional dictionary data associated with the sensed areas.

DESCRIPTION OF THE PREFERRED EMBODIMENTS

Hereinafter, there will be described embodiments of the present invention.

Figure 1:
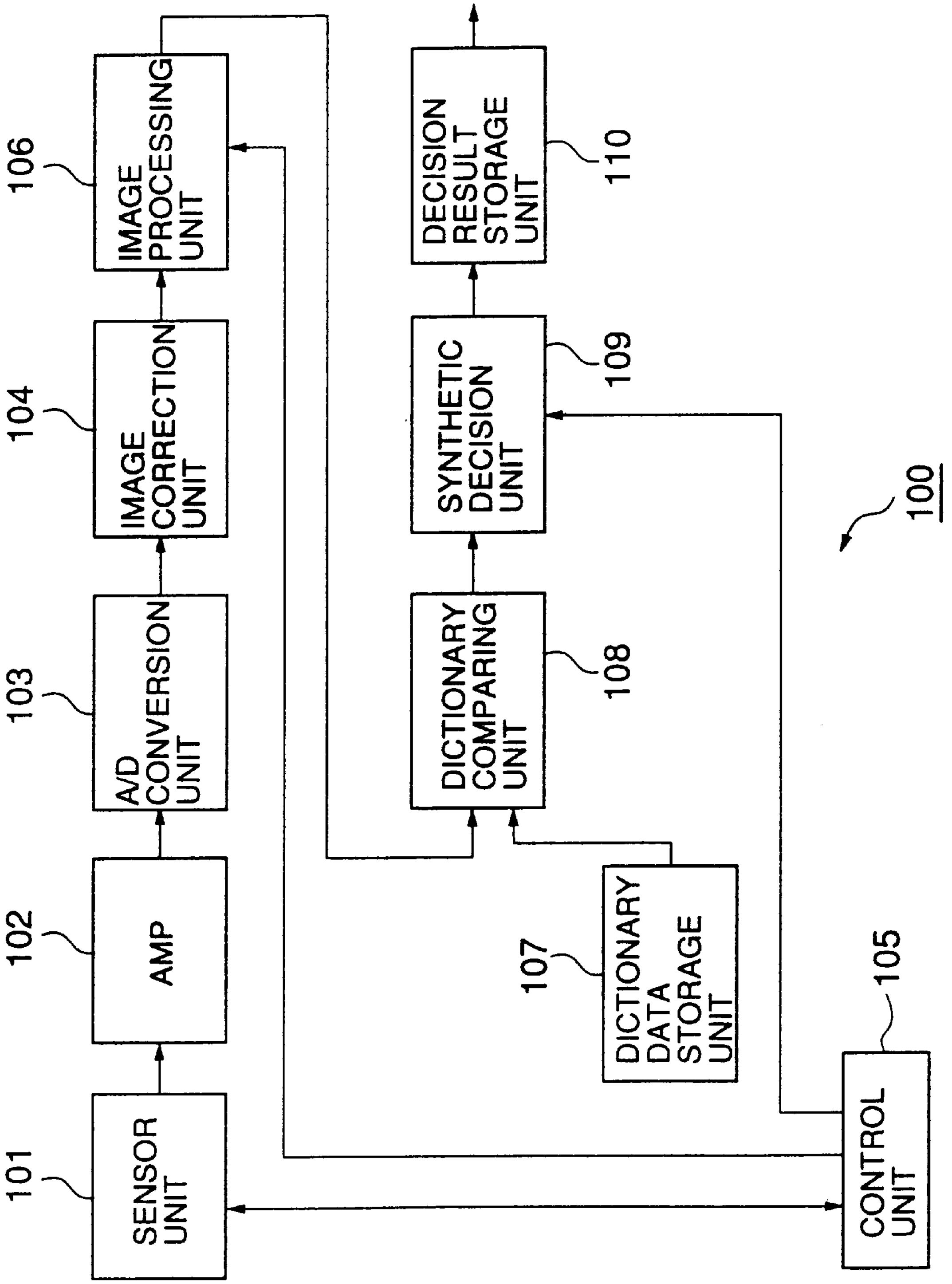
FIG. 1 is a block diagram of a first paper discriminating apparatus according to an embodiment of the present invention.

FIG. 1 is a block diagram of a first paper discriminating apparatus according to an embodiment of the present invention.

A paper discriminating apparatus 100, which is incorporated into an ATM, performs discrimination among a plurality of sorts of paper money traveled inside the ATM. A mechanism for conveying paper money inside the ATM permits paper money to be conveyed even if the paper money somewhat slants with respect to a traveling direction. Thus, the paper discriminating apparatus 100 is able to discriminate also the paper money traveled at a slant.

The paper discriminating apparatus 100 has a sensor unit 101 for scanning paper money to generate image data, an amplifier unit 102 for amplifying the image data generated in the sensor unit 101, and an A/D conversion unit 103 for performing an A/D conversion for the image data amplified in the amplifier unit 102.

Figure 2:
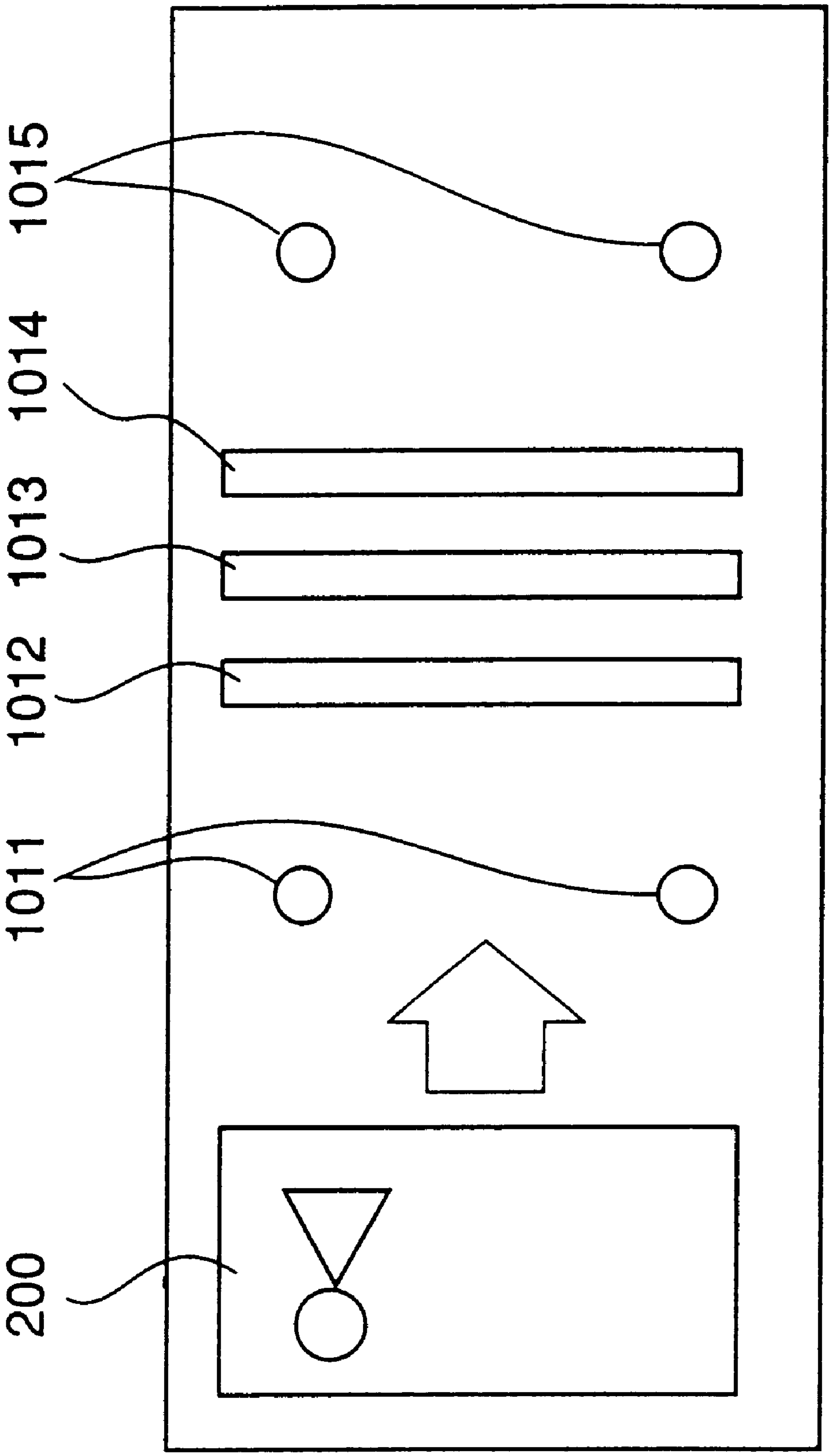
FIG. 2 is a view showing the details of a sensor unit shown in FIG. 1.

FIG. 2 is a view showing the details of the sensor unit shown in FIG. 1.

The sensor unit 101 comprises entry sensors 1011, an optical line sensor 1012, a magnetic line sensor 1013, a thickness sensor 1014, and passage sensors 1015. The optical line sensor 1012 and the magnetic line sensor 1013 are examples of the line sensor referred to in the present invention. Paper money 200 is conveyed from the left side of the figure via the sensor unit 101 to the right side of the figure. It happens that the paper money 200 is conveyed in the state that it somewhat slants as mentioned above.

Each of the entry sensors 1011 is a type of an optical sensor, and two such entry sensors 1011 are provided. The entry sensors 1011 detect the conveyed paper money 200 to obtain detection information which becomes a signal for a start of a predetermined operation of the paper discriminating apparatus 100. Further, two such entry sensors 1011 individually detect the paper money 200 to determine a slant of the paper money 200 with respect to a traveling direction of the paper money 200 in accordance with a difference between their detected times of the paper money 200.

Figure 3A:
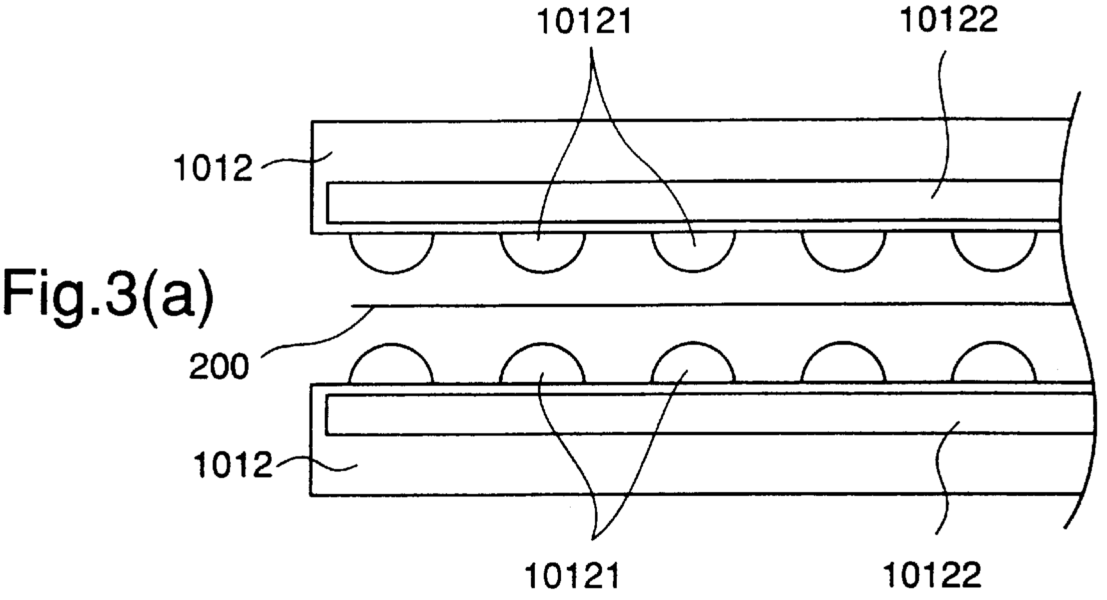
FIG. 3(*a*) is an illustration of an optical line sensor, and FIG. 3(*b*) is an illustration of areas of a paper.
Figure 3B:
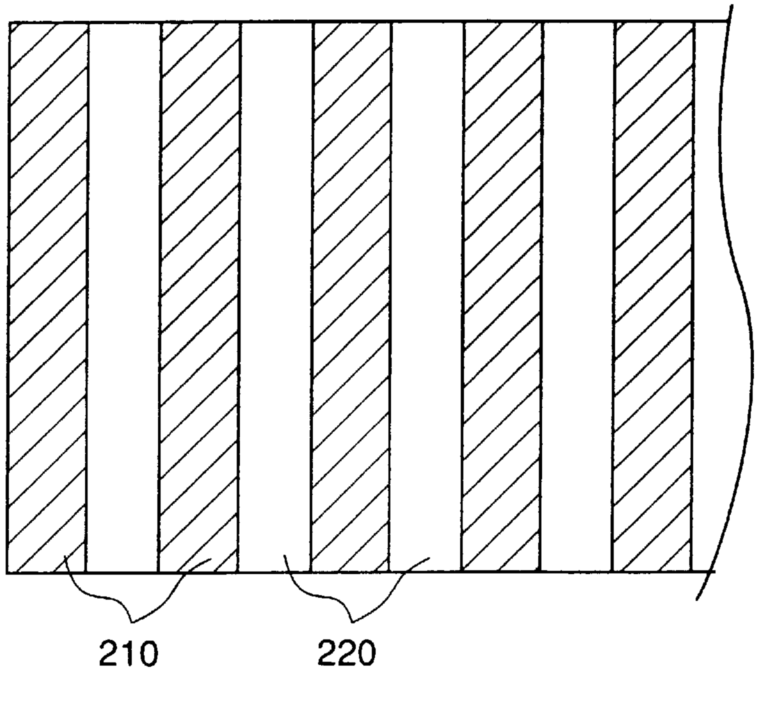
Figure 4A:
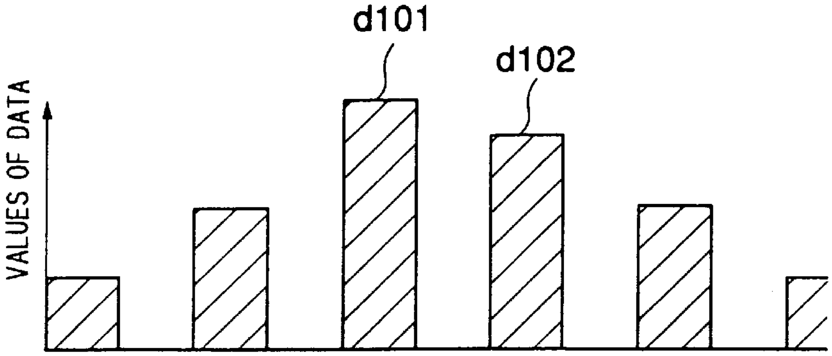
FIGS. 4(*a*), 4(*b*), 4(*c*) and 4(*d*) are graphs each showing image data obtained by a line sensor and image data generated by a data correction unit.
Figure 4B:
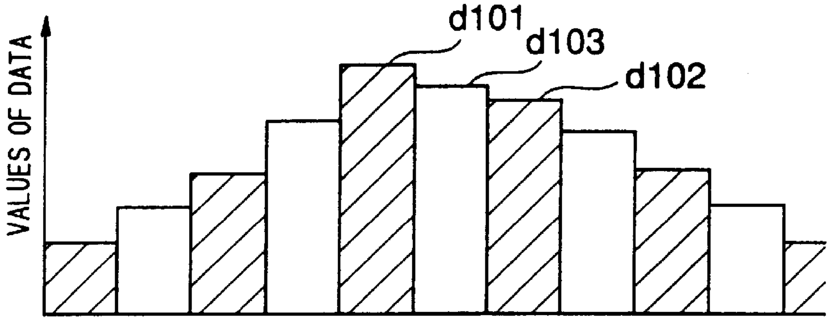
Figure 4C:
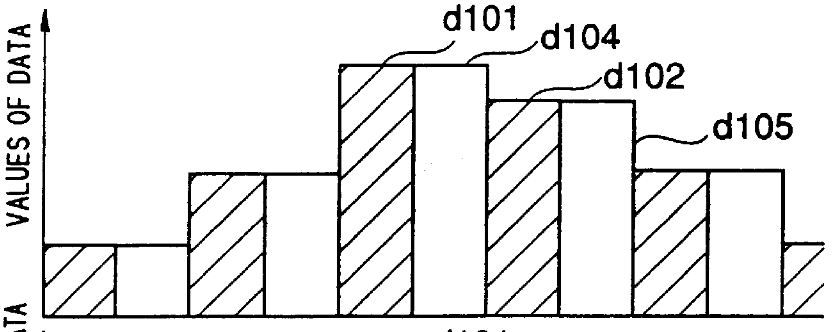
Figure 4D:
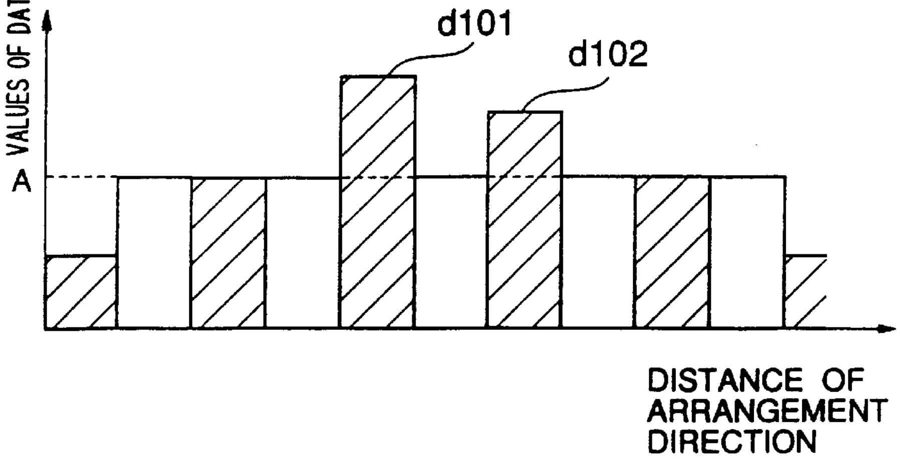
Figure 6:
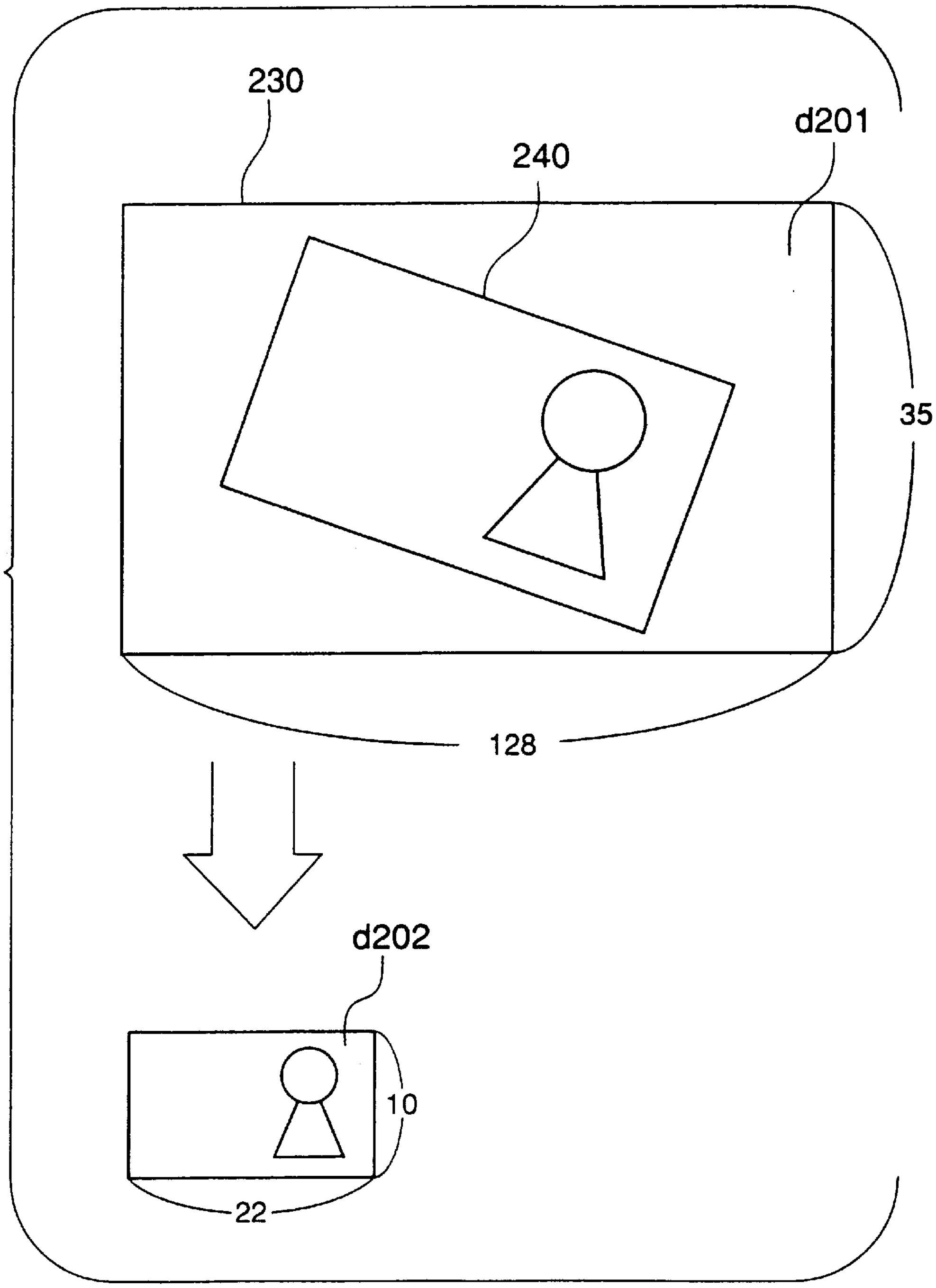
FIG. 6 is a conceptual view useful for understanding an image processing.

As shown in FIG. 3(*a*), the optical line sensor 1012 comprises 64 pieces of optical sensor device 10121 arranged in a vertical direction (a right and left direction in FIG. 3(*a*)) with respect to a traveling direction (a direction vertical to a sheet face of FIG. 3(*a*)) of the paper money 200. The 64 pieces of optical sensor device 10121 are arranged at intervals of one optical sensor device corresponding between the adjacent optical sensor devices 10121. Each of the optical sensor devices 10121 detects an associated area of the paper money 200 traveling inside the sensor unit 101, which area the associated optical sensor device 10121 faces, the area having the same extent of area as that of the associated optical sensor device. After the paper money is detected by the entry sensors 1011, each of the optical sensor devices performs 35 times of detection on the paper money at regular intervals. Thus, the paper money 200 is scanned in the traveling direction by the optical sensor devices 10121 constituting the optical line sensor 1012, and as a result, as shown in FIG. 3(*b*), sensed areas 210 respectively detected by the associated optical sensor devices and non-sensed areas 220 not detected by any optical sensor device are alternately formed as stripes. Further, as shown in FIG. 6 which will be described later, a scanning range 230 permitted in scanning by the optical line sensor 1012 is spread to a somewhat broader range than the limit defined by an outline 240. Consequently, even if the paper money 200 is somewhat slantwise conveyed, the paper money 200 is accommodated in the scanning range 230.

Incidentally, according to the present embodiment, while an interval corresponding to one sensor device is provided between the adjacent optical sensor devices, it is acceptable that an interval corresponding to two or more sensor devices is provided between the adjacent optical sensor devices. However, the explanation will be continued assuming that an interval corresponding to one sensor device is provided between the adjacent optical sensor devices.

As shown in FIG. 3(*a*), the two optical line sensors 1012 are provided in such a manner that the paper money 200 is sandwiched between the two optical line sensors 1012. Each of the optical line sensors 1012 is provided with a light emitting device 10122 for applying light to the paper money 200. These light emitting devices 10122 emit light for each time of the above-mentioned 35 times of detection. The light emitting device 10122 shown in the upper side of FIG. 3(*a*) is different from the light emitting device 10122 shown in the lower side of FIG. 3(*a*) in timing of light emission. While the light emitting device 10122 shown in the upper side of FIG. 3(*a*) emits light, the respective optical sensor devices 10121 shown in the upper side of FIG. 3(*a*) detects the paper money 200 to generate image data as to a face of the upper side of the paper money 200 shown in FIG. 3(*a*) through the reflected light. Simultaneously, while the light emitting device 10122 shown in the upper side of FIG. 3(*a*) emits light, the respective optical sensor devices 10121 shown in the lower side of FIG. 3(*a*) also detects the paper money 200 to generate image data through the transmitted light. Likewise, while the light emitting device 10122 shown in the lower side of FIG. 3(*a*) emits light, the respective optical sensor devices 10121 shown in the lower side of FIG. 3(*a*) detects the paper money 200 to generate image data as to a face of the lower side of the paper money 200 shown in FIG. 3(*a*) through the reflected light. And simultaneously, while the light emitting device 10122 shown in the lower side of FIG. 3(*a*) emits light, the respective optical sensor devices 10121 shown in the upper side of FIG. 3(*a*) also detects the paper money 200 to generate image data through the transmitted light. Of the above-mentioned 4 types of image data, two types of image data due to the transmitted light are added to one another to form a single type of image data.

The magnetic line sensor 1013 is, similar to the optical line sensor 1012, a sort of the line sensor referred to in the present invention. The magnetic line sensor 1013 is substantially the same as the optical line sensor 1012 except for the points that while the optical line sensor 1012 consists of the optical sensor devices being arranged, the magnetic line sensor 1013 consists of the magnetic sensor devices being arranged, and while the optical line sensor 1012 has the light emitting device, the magnetic line sensor 1013 has no device corresponding to the light emitting device. Further, the magnetic line sensor 1013 is of a single different from the optical line sensor 1012. Thus, according to the single magnetic line sensor 1013, there is obtained image data representative of one magnetic image. Hereinafter, for convenience of explanation, the optical line sensor 1012 and the magnetic line sensor 1013 are referred to as the “line sensor” without any distinction therebetween, and the optical sensor devices constituting the optical line sensor 1012 and the magnetic sensor devices constituting the magnetic line sensor 1013 are referred to as the “sensor devices” without any distinction therebetween. Further, hereinafter, the respective image data derived from the optical line sensor 1012 and the magnetic line sensor 1013 are simply referred to as the “image data” without any distinction therebetween. It is noted that hereinafter, the explanation will be continued assuming that the limit of the area of the paper money 200, which is to be detected by the optical sensor devices of the optical line sensor 1012, and the limit of the area of the paper money 200, which is to be detected by the magnetic sensor devices of the magnetic line sensor 1013, are the same as each other, and those areas are simply referred to as the “sensed area” without any distinction therebetween. Likewise, areas, which are not detected by any sensor devices, are referred to as the “non-sensed area”.

The thickness sensor 1014 is for mechanically measuring thickness of the paper money 200 to obtain a conveyance direction distribution of the thickness of the paper money 200.

Each of the passage sensors 1015 is an optical sensor for detecting the paper money 200, and there are provided two pieces of passage sensors 1015 in a similar fashion to that of the entry sensors 1011. A passage velocity as to the passage of the paper money 200 through the sensor unit 101 is determined on the basis of a difference between a time in which the paper money 200 is detected by the entry sensors 1011 and a time in which the paper money 200 is detected by the passage sensors 1015. The passage velocity thus obtained is used for a synthetic decision which will be described hereinafter.

The explanation will be continued returning to FIG. 1.

The paper discriminating apparatus 100 has a data correction unit 104 for producing image data corresponding to the non-sensed areas. The data correction unit 104 generates image data corresponding to the full range of the paper money in combination of the image data corresponding to the non-sensed areas produced by itself and the image data corresponding to the sensed areas derived from the line sensors.

FIGS. 4(*a*), 4(*b*), 4(*c*) and 4(*d*) are graphs each showing image data obtained by a line sensor and image data generated by a data correction unit.

The axis of abscissas of each of the graphs of FIGS. 4(*a*), 4(*b*), 4(*c*) and 4(*d*) stands for distance of the arrangement direction of sensor devices on the paper money, and the axis of ordinates stands for values of data.

The graph of FIG. 4(*a*) shows, of the image data obtained by the line sensors, data portions corresponding to the detection for the first time by the sensor devices. As mentioned above, in this case, since the sensed areas and the non-sensed areas are alternately shaped as stripes, this graph is a comb-shaped one.

It is noted that each of the graphs of FIGS. 4(*a*), 4(*b*), 4(*c*) and 4(*d*) shows a relation between the image data corresponding to the sensed areas and the image data corresponding to the non-sensed areas, where data d101 and d102 shown in FIG. 4(*a*) are the same as data d101 and d102 shown in FIGS. 4(*b*), 4(*c*) and 4(*d*), respectively.

FIG. 4(*b*) shows a graph in which data d101 and d102 associated with two sensed areas between which non-sensed area is interposed are averaged to generate data d103, and the data d103 thus generated is associated with the non-sensed area.

FIG. 4(*c*) shows a graph in which data d101 and d102 associated with sensed areas are copied to generate data d104 and data d105, and those data thus generated are associated with non-sensed areas adjacent to the associated sensed areas, respectively.

FIG. 4(*d*) shows a graph in which data indicating a certain value A is generated and the data thus generated is associated with the respective non-sensed areas.

The data correction unit 104 (cf. FIG. 1) generates, as image data associated with non-sensed areas, as shown in FIG. 4(*b*), image data in which data associated with two sensed areas between which non-sensed area is interposed are averaged, and the image data thus generated is associated with the non-sensed area.

It is acceptable, however, that the data correction unit referred to in the present invention is to generate image data associated with the non-sensed areas using an interpolation processing rather than the average processing. Alternatively, it is acceptable that as shown in FIG. 4(*c*), image data associated with sensed areas are copied to generate data, and those data thus generated are associated with non-sensed areas adjacent to the associated sensed areas, respectively, or it is also acceptable that as shown in FIG. 4(*d*), data indicating a certain value A is generated and the data thus generated is associated with the respective non-sensed areas.

According to the present embodiment, the data correction unit 104 is connected to the A/D conversion unit 103 at the later stage so as to generate the image data associated with the non-sensed areas in the form of digital data after the A/D conversion. However, the data correction unit referred to in the present invention is not restricted to the type of the data correction unit 104 in the present embodiment, and it is acceptable that the image data associated with the non-sensed areas are generated in the form of analog data before the A/D conversion.

As mentioned above, as a result of formation of image data associated with the non-sensed areas, the combination of the image data associated with the sensed areas and the image data associated with the non-sensed areas makes it possible to obtain image data d201 associated with the full range of the paper money, which is representative of a mosaic of 35×128 as shown in FIG. 6.

Referring to FIG. 1, the paper discriminating apparatus 100 has a control unit 105 for controlling the respective units of the paper discriminating apparatus 100.

Figure 5:
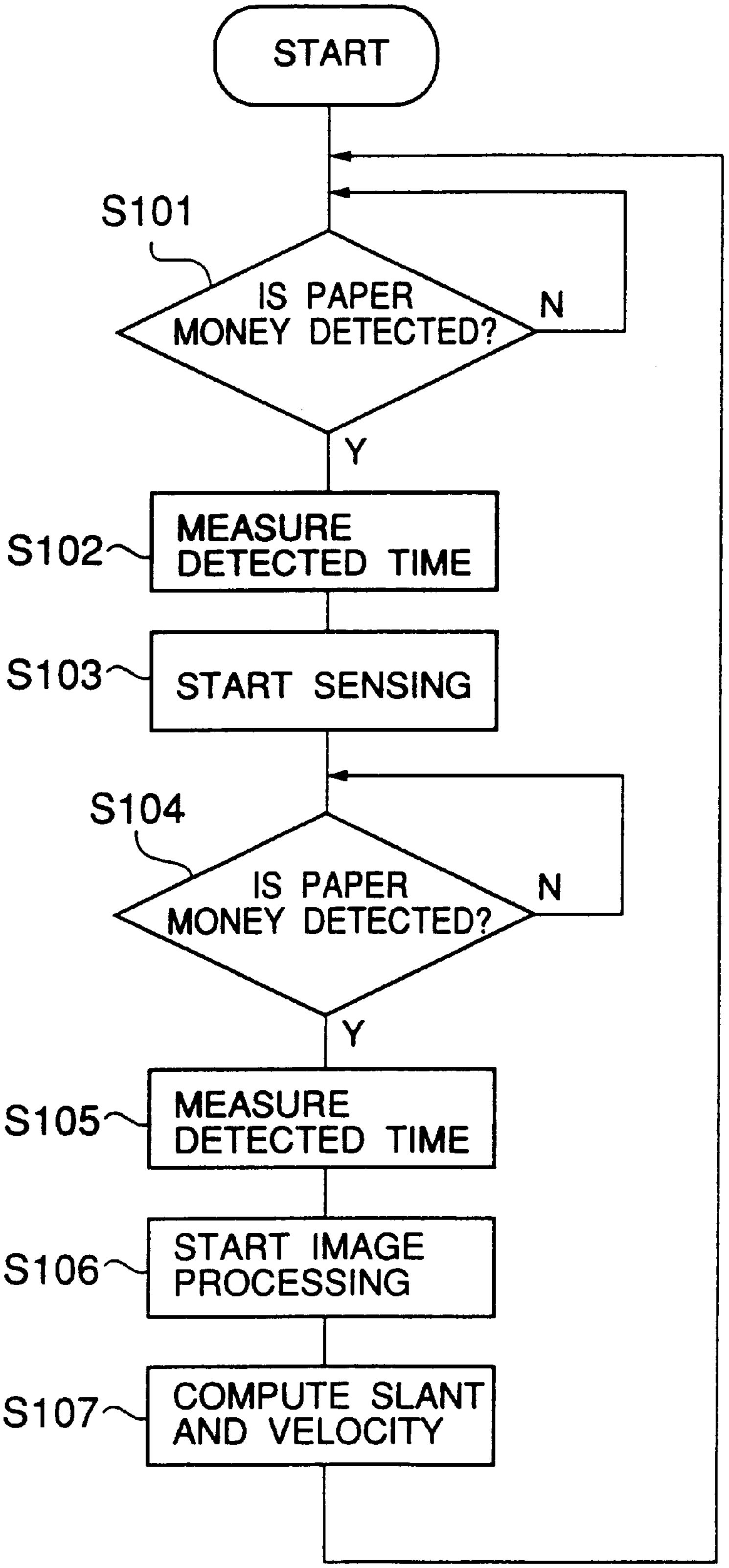
FIG. 5 is a flowchart useful for understanding an operation of a control unit.

Hereinafter, there will be explained an operation of the control unit 105 referring to FIG. 1 and a flowchart shown in FIG. 5.

The control unit 105 receives sensed information of paper money detected by the entry sensors of the sensor unit 101. When the entry sensors detect the paper money (step 101), a detected time of the paper money is measured by the use of a clock signal generated from a clock circuit not shown (step 102), and an initiation of the detection by the line sensors is signaled (step 103). Further, the control unit 105 receives sensed information of the paper money detected by the passage sensors of the sensor unit 101. When the passage sensors detect the paper money (step 104), a detected time of the paper money is measured (step 105), and an initiation of the image processing is signaled (step 106). And thereafter, measured values of the detected times are used to compute a slant of the paper money with respect to the conveyance direction, and a velocity of the paper money passed through the sensor unit 101 (step 107). The above-mentioned procedure is repeated on each of paper moneys sequentially conveyed.

Again referring to FIG. 1, the paper discriminating apparatus 100 has an image processing unit 106. Upon receipt of a signal of the initiation of the image processing issued from the control unit 105, and the computed value as to the slant of the paper money with respect to the conveyance direction, the image processing unit 106 initiates the image processing which will be described hereinafter.

As mentioned above, a paper money conveyed through the inside of the ATM may be conveyed as it is, even if it somewhat slants with respect to the conveyance direction. FIG. 6 shows at the upper side a typical illustration showing image data obtained through a detection of the paper money thus conveyed at a slant by the line sensors. A range 230 encircled with the most outside of oblong is a range to be scanned by the line sensors. The line sensors generate image data d201 in which this range is represented by a mosaic of 35×128. An oblong 240, which is disposed at a slant inside the range 230 to be scanned by the line sensors, denotes an outline of the paper money conveyed at a slant.

The image processing unit 106 performs an image processing on the basis of the computed value as to the slant of the paper money received from the control unit 105 and the image data d201 representative of the mosaic of 35×128 corresponding to the full range of the paper money as shown in FIG. 6. In this image processing, first, there is performed a slant correction through a rotary translation so that the paper money takes its proper direction on the basis of the image data d201 representative of the mosaic of 35×128 and the computed value as to the slant of the paper money. Next, an error due to unevenness in density of ink for each paper money is corrected. Further, according to this image processing, image data associated with the range encircled by the outline 240 of the paper money is cut out from the image data d201 representative of the mosaic of 35×128, and the associated image data among a plurality of mosaics included in each of pixels consisting of 10×22 into which the paper money is partitioned are averaged for each pixel, so that image data d202, in which the full range of the paper money is represented by pixels of 10×22, is formed, as shown in FIG. 6.

The paper discriminating apparatus 100 further comprises: a dictionary data storage unit 107 for storing dictionary data which represents the full range of the true paper money by pixels of 10×22; and a dictionary comparing unit 108 for comparing the image data d202 generated by the image processing unit 106 with the dictionary data stored in the dictionary data storage unit 107 to perform a decision of sort of money and a decision of authenticity as to paper money, and in addition an authenticity decision taking account of information as to the distribution of the thickness obtained by the thickness sensor.

Practicing the above-mentioned image processing on the image data makes it possible to produce image data in which the image data associated with the sensed areas and the image data generated in the data correction unit 104 are averaged. Performing the authenticity decision based on such an averaged image data makes it possible to perform a discrimination based on an overall aspect of the paper money. Hitherto, a discrimination of a paper money is performed on the basis of an overall aspect of the paper money. And thus practicing the above-mentioned image processing on the image data makes it possible to obtain the same accuracy in discrimination as the earlier technology.

The paper discriminating apparatus 100 further comprises a synthetic unit 109 and a decision result storage unit 110. The synthetic unit 109 decides, as to whether the paper money is to be treated as the true paper money, on the basis of the various decision results by the dictionary comparing unit 108 and the slant and the passage velocity computed by the control unit 105. A decision result thus obtained is stored in the decision result storage unit 110. The decision result storage unit 110 stores also a decision result as to sorts of money, etc. The decision results and the like stored in the decision result storage unit 110 are read out by apparatuses but the paper discriminating apparatus 100, which constitutes an ATM, to be utilized.

As mentioned above, according to the paper discriminating apparatus 100, it is possible to discriminate paper money using dictionary data, which have been used in the conventional paper discriminating apparatus, associated with the full range of the paper money, without any changes, and thereby contributing to reduction of the sensor devices without producing any additional dictionary data.

Incidentally, according to the present embodiment, while the sensor devices are thinned on both the optical line sensor 1012 and the magnetic line sensor 1013, it is acceptable for the paper discriminating apparatus according to the present invention that the sensor devices are thinned on either one of the optical line sensor 1012 and the magnetic line sensor 1013.

Figure 7:
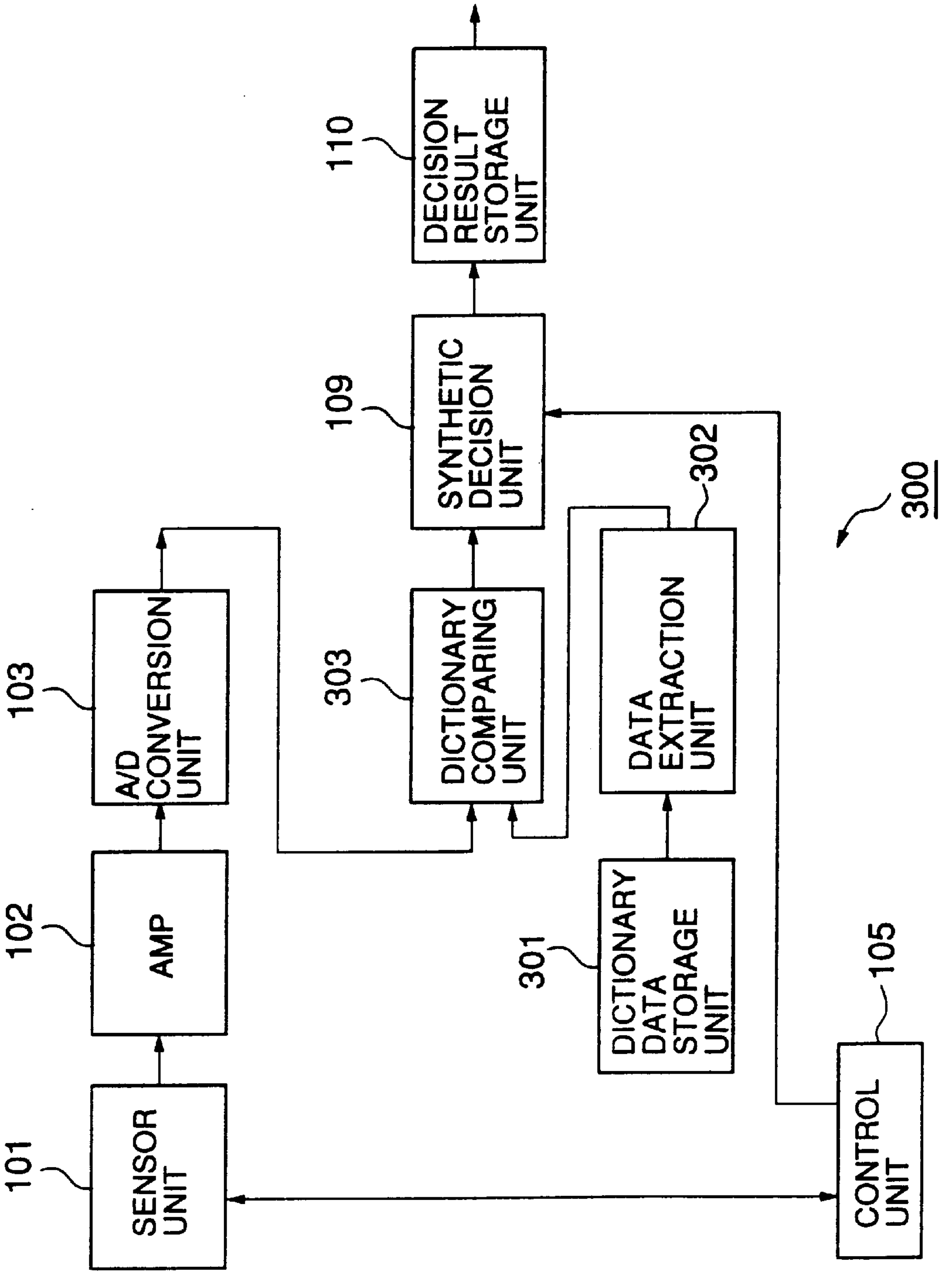
FIG. 7 is a block diagram of a second paper discriminating apparatus according to an embodiment of the present invention.

FIG. 7 is a block diagram of a second paper discriminating apparatus according to an alternative embodiment of the present invention.

In FIG. 7, the same parts are denoted by the same reference numbers as those of FIG. 1, and the redundant description will be omitted.

A paper discriminating apparatus 300 is incorporated into an ATM to perform a discrimination of paper money. In the ATM, a mechanism for conveying paper money is provided with a guide for preventing a paper money from slanting with respect to a direction of the conveyance. Consequently, according to the paper discriminating apparatus 300, there is no need to perform a slant correction to direct the slanted paper money as shown in FIG. 6 to a proper direction, and thus the image processing unit 106 of the paper discriminating apparatus 100 is omitted.

Figure 8A:
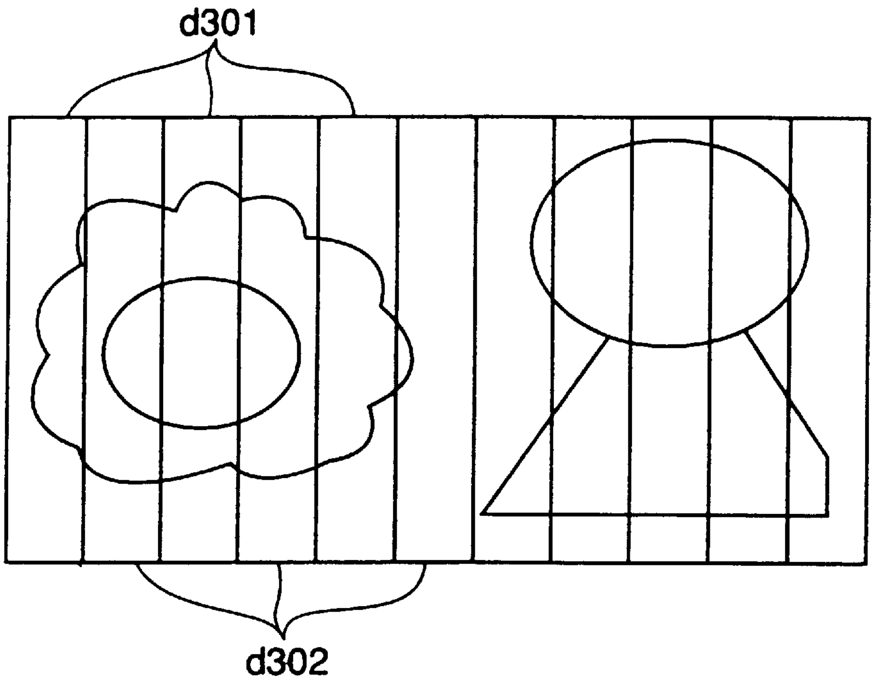
FIGS. 8(*a*) and 8(*b*) are conceptual views useful for understanding an image processing.
Figure 8B:
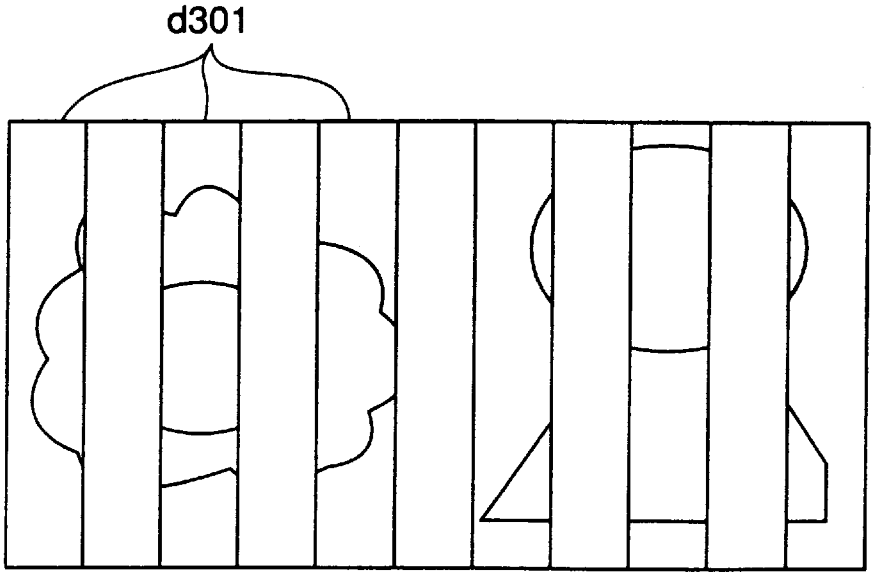

The paper discriminating apparatus 300 has a dictionary data storage unit 301 and a data extraction unit 302. The dictionary data storage unit 301 stores therein dictionary data associated with the full range of the true paper money, including partial data d301 associated with the sensed areas and partial data d302 associated the non-sensed areas, as shown in FIG. 8(*a*). The data extraction unit 302 extracts the partial data d301 associated the sense areas from the dictionary data stored in the dictionary data storage unit 301, as shown in FIG. 8(*b*).

The paper discriminating apparatus 300 further has a dictionary comparing unit 303 for comparing the image data obtained by the line sensors with the partial data extracted by the data extraction unit 302, and thereby performing a decision of sort of money, a decision of authenticity as to paper money, and the like.

According to the paper discriminating apparatus 300, it is possible to extract the partial data from the dictionary data, which are used in the conventional paper discriminating apparatus, associated with the full range of the paper money, and thereby discriminating the paper money on the basis of the partial data thus extracted. Consequently, it is possible to contribute to reduction of the sensor devices without producing any additional dictionary data.

As mentioned above, according to the paper discriminating apparatus of the present invention, it is possible to contribute to reduction of the sensor devices without producing any additional dictionary data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A paper discriminating apparatus wherein a paper conveyed in a predetermined conveyance direction is scanned in conjunction with a conveyance of the paper by a plurality of sensor devices arranged in an arrangement direction intersecting the predetermined conveyance direction to detect areas of the paper each being longitudinal with respect to the conveyance direction by associated sensor devices, respectively, and the paper is discriminated in accordance with image data obtained through a detection of the paper, said paper discriminating apparatus comprising:

a line sensor in which a plurality of sensor devices are arranged in the arrangement direction in such a manner that a non-sensed area on the paper, which is not detected by any of the sensor devices, is formed between two sensed areas to be detected by two adjacent sensor devices;

a data correction unit generating image data associated with the non-sensed area on the paper;

a dictionary data unit storing dictionary data associated with a full range of the paper, the dictionary data being reference data for discrimination of the paper; and a dictionary comparing unit comparing image data associated with the full range of the paper, the data comprising image data as to the sensed areas obtained by said line sensor and image data as to the non-sensed areas obtained by said data correction unit, with the dictionary data stored in said dictionary data unit, and thereby discriminating the paper detected by said line sensor.

2. A paper discriminating apparatus according to claim 1, wherein said paper discriminating apparatus further comprises an image processing unit applying a predetermined image processing to the image data associated with the full range of the paper, said image data comprising image data as to the sensed areas obtained by said line sensor and image data as to the non-sensed areas obtained by said data correction unit, said dictionary unit stores dictionary data associated with image data subjected to the image processing by said image processing unit, and said dictionary comparing unit compares the image data subjected to the image processing by said image processing unit with the dictionary data stored in said dictionary data unit, and thereby discriminating the paper detected by said line sensor.

3. A paper discriminating apparatus according to claim 1, wherein said data correction unit applies an interpolation processing to the image data as to the sensed areas obtained by said line sensor to generate image data as to the non-sensed areas.

4. A paper discriminating apparatus according to claim 1, wherein said data correction unit copies the image data as to the sensed areas obtained by said line sensor to be associated with each associated adjacent non-sensed area.

5. A paper discriminating apparatus according to claim 1, wherein said data correction unit causes a predetermined value to be associated with the non-sensed area.

6. A paper discriminating apparatus wherein a paper conveyed in a predetermined conveyance direction is scanned in conjunction with a conveyance of the paper by a plurality of sensor devices arranged in an arrangement direction intersecting the predetermined conveyance direction to detect areas of the paper each being longitudinal with respect to the conveyance direction by associated sensor devices, respectively, and the paper is discriminated in accordance with image data obtained through a detection of the paper, said paper discriminating apparatus comprising:

a line sensor in which a plurality of sensor devices are arranged in the arrangement direction in such a manner that a non-sensed area on the paper, which is not detected by any of the sensor devices, is formed between two sensed areas to be detected by two adjacent sensor devices;

a dictionary data unit storing dictionary data associated with a full range of the paper, said dictionary data being reference data for discrimination of the paper;

a data extraction unit extracting partial data associated with sensed areas of a stripe shape on the paper detected by said line sensor from the dictionary data stored in said dictionary data unit; and a dictionary comparing unit comparing image data as to the sensed areas obtained by said line sensor with the partial data extraction by said data extraction unit, and thereby discriminating the paper detected by said line sensor.

7. An image discriminating apparatus, comprising:

a plurality of sensor devices for sensing an image of an object as the object is conveyed through said apparatus and providing sensed image data, the sensor devices being arranged such that the areas of the object between adjacent sensor devices are not sensed;

a data correction unit generating image data associated with the areas not sensed;

a dictionary data unit storing dictionary data associated with the entire area of the object; and a dictionary comparing unit comparing image data associated with the entire area of the object with the dictionary data, the entire object image data comprising the image data for the sensed areas and the image data for the areas not sensed.

8. A method for discriminating object images, comprising:

sensing portions of an object;

generating image data for areas of the object not sensed;

storing dictionary data associated with the entire area of the object; and comparing image data associated with the entire area of the object with the dictionary data, the entire object image data comprising the image data for the sensed areas and the image data for the areas not sensed.

9. An image discriminating apparatus, comprising:

a plurality of sensor devices for sensing an image of an object as the object is conveyed through said apparatus and providing sensed image data, the sensor devices being arranged such that the areas of the object between adjacent sensor devices are not sensed;

a dictionary data unit storing dictionary data associated with the entire area of the object;

a data extraction unit extracting partial data associated with the sensed areas from the dictionary data; and a dictionary comparing unit comparing the image data for the sensed areas with the partial data.

10. A method for discriminating object images, comprising:

sensing portions of an object;

generating image data for areas of the object not sensed;

storing dictionary data associated with the entire area of the object;

extracting partial data associated with the sensed areas from the dictionary data; and comparing the image data for the sensed areas with the partial data.

* * * * *